US008755161B2

(12) United States Patent
James

(10) Patent No.: US 8,755,161 B2
(45) Date of Patent: Jun. 17, 2014

(54) OVERVOLTAGE PROTECTION CIRCUIT WITH SELF BIASED LATCH

(75) Inventor: John J James, Felton, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 103 days.

(21) Appl. No.: 13/536,461

(22) Filed: Jun. 28, 2012

(65) Prior Publication Data

US 2014/0002941 A1   Jan. 2, 2014

(51) Int. Cl.
*H02H 9/08*   (2006.01)

(52) U.S. Cl.
USPC ........................................ 361/91.1; 361/93.9

(58) Field of Classification Search
USPC ................. 361/93.7–93.9, 91.1, 111
See application file for complete search history.

(56) References Cited

U.S. PATENT DOCUMENTS

| | | | |
|---|---|---|---|
| 3,558,979 A | 1/1971 | Lorenz | |
| 4,005,342 A | 1/1977 | Davis | |
| 5,130,883 A | 7/1992 | Edwards | |
| 5,483,406 A | 1/1996 | Bennett | |
| 6,002,566 A | 12/1999 | Arikawa | |
| 6,031,701 A | 2/2000 | Maeckel | |
| 6,816,348 B2 * | 11/2004 | Chen et al. | 361/56 |
| 6,940,703 B1 | 9/2005 | Kemp | |
| 2007/0165341 A1 | 7/2007 | Wei | |
| 2010/0284114 A1 * | 11/2010 | Kilroy et al. | 361/86 |

OTHER PUBLICATIONS

Menniti, "Low Drop Regulator with Overvoltage Protection and Reset Function for Automotive Environment", IEEE JSSC, v. SC-19, p. 442. Jun. 1984.
Linear Technology, "LTC4361-1/LTC4361-2 Overvoltage/Overcurrent Protection Controller", Linear Technology Application Note, Rev. A, Jan. 2011.
Maxim, "Application Note 760, Overvoltage Protection in Automotive Systems", Maxim Integrated Products, Apr. 2002.
Burr-Brown "INA 138, INA 168, High-Side Measurement Current Shunt Monitor", Texas Instruments Application Note, Rev. Nov. 2005.
Matthews, "LMV431, Overvoltage Protection Circuit for Automotive Load Dump", Texas Instruments Application Note 1533, Dec. 2006.
Unitrode, "UCC2912, UCC3912, Programmable Hot Swap Power Manager", Texas Instruments Application Note, Rev. Nov. 2003.
Aliosi and Andreycak, "Unitrode DN-68: Paralleling UCC3912 Electronic Circuit Breaker ICs", Texas Instruments Application Note, 1999.

* cited by examiner

*Primary Examiner* — Danny Nguyen
(74) *Attorney, Agent, or Firm* — NUPAT, LLC

(57) ABSTRACT

An overvoltage protection circuit is based on replacing the bias resistor in a conventional overvoltage protection circuit with a self-biased latch. The new circuit automatically survives both overvoltage and overcurrent events.

9 Claims, 4 Drawing Sheets

OVERVOLTAGE PROTECTION CIRCUIT WITH SELF BIASED LATCH

TECHNICAL FIELD

The disclosure is related to overvoltage and overcurrent protection for electronic circuits.

BACKGROUND

The 1977 Oldsmobile Toronado was one of the first cars to have a microprocessor-based engine control unit. Since then the importance of electronics in cars, trucks, tractors and other vehicles has increased dramatically. Today, even low-end cars have dozens of microprocessors executing tens of millions of lines of software code to control ignition timing, anti-lock braking, airbag deployment, GPS navigation, etc. Aftermarket electronics for navigation, autopilots, asset tracking devices and myriad other applications are seemingly everywhere as people expect modern digital convenience on the go. Microprocessors, GPS receivers, communications radios, and other electronics, versatile as they are, require some protection in an automotive electrical environment, however.

Consider for example a dozer operator in Brazil who needs to start a dozer with a dead battery. Lacking jumper cables, he starts another dozer that has a good battery and then removes the battery with the dozer engine running. He uses the good battery to start the first dozer and puts the dead battery in the dozer that's already running to charge it. This inadvisable procedure (removing a battery with engine running) produces an alternator load dump that puts hundreds of volts across the dozer's nominally 12-volt electrical system and instantly destroys unprotected electronic equipment.

Or imagine a jeepney driver in Manila whose vehicle is equipped with an asset tracking device that sends its position back to a central office. The tracking box is mounted near the roof and connected to the vehicle electrical system by wires that run under the driver's seat. Unfortunately, due to poor installation and flimsy insulation, the weight of the driver compresses the cable under the seat and shorts it out whenever the jeepney hits an especially hard bump. Normally the short does not last long enough to blow a fuse, but sometimes it does. The jeepney company wonders why the fuses blow so often.

FIG. 1 is a schematic diagram for a conventional overvoltage protection circuit used in automotive systems. In the circuit, $V_{OUT}$ is protected from excess voltage at $V_{IN}$, and fuse F1 provides overcurrent protection. The operation of the circuit is as follows.

A trigger voltage is defined by $V_{TR}=V_{REF}+V_{BE}$. Here $V_{REF}$ is the breakdown voltage of Zener diode D1 and $V_{BE}(\approx 0.6\,V)$ is the base-emitter voltage of transistor Q1. D1 is called the "reference diode" because it sets the input voltage above which the circuit cuts off the output. If $V_{IN}$ is less than $V_{TR}$ then $V_{OUT}$ is equal to $V_{IN}$. If $V_{IN}$ is greater than $V_{TR}$ then $V_{OUT}$ is zero.

In more detail, when $V_{IN}<V_{TR}$: no current flows through D1; Q1 is cut off; the gate voltage of MOSFET pass transistor Q2 is at ground; and Q2 is on. On the other hand, when $V_{IN}>V_{TR}$: current flows through D1; the base current of Q1 is $(V_{IN}-V_{TR})/R2$; Q1 is saturated; the gate voltage of Q2 is $(V_{IN}-V_{CE})$; and Q2 is off. ($V_{CE}$ is the collector-emitter voltage of Q1.)

Zener diode D2 protects Q2 by preventing the gate voltage from becoming too great. R1 keeps Q1 turned off when $V_{IN}$ is less than $V_{TR}$. R2 sets the base current of Q1 when D1 turns on. Q1 is called the "control transistor" because it supplies current to R4 (called the "bias resistor") to raise the gate voltage of Q2, turning Q2 off.

A circuit like that shown in FIG. 1 will save the dozer driver from frying his GPS, but it won't stop the jeepney company from having to buy more fuses. What is needed is an overvoltage/overcurrent protection circuit that doesn't require operator assistance. The circuit should clamp voltage spikes, disconnect the load whenever a short circuit occurs, and reconnect the load when the short circuit is removed.

DETAILED DESCRIPTION

The overvoltage protection circuit described below is based on replacing the bias resistor in a conventional overvoltage protection circuit (i.e. R4 in FIG. 1) with a self-biased latch. The new circuit automatically survives both overvoltage and overcurrent events. If short circuit protection is not needed, the circuit may be configured for overvoltage protection only. The self-biased latch is described first, followed by a description of an overvoltage/overcurrent protection circuit that uses the self biased-latch, and finally an example of the protection circuit in an automotive scenario.

Figure 2:
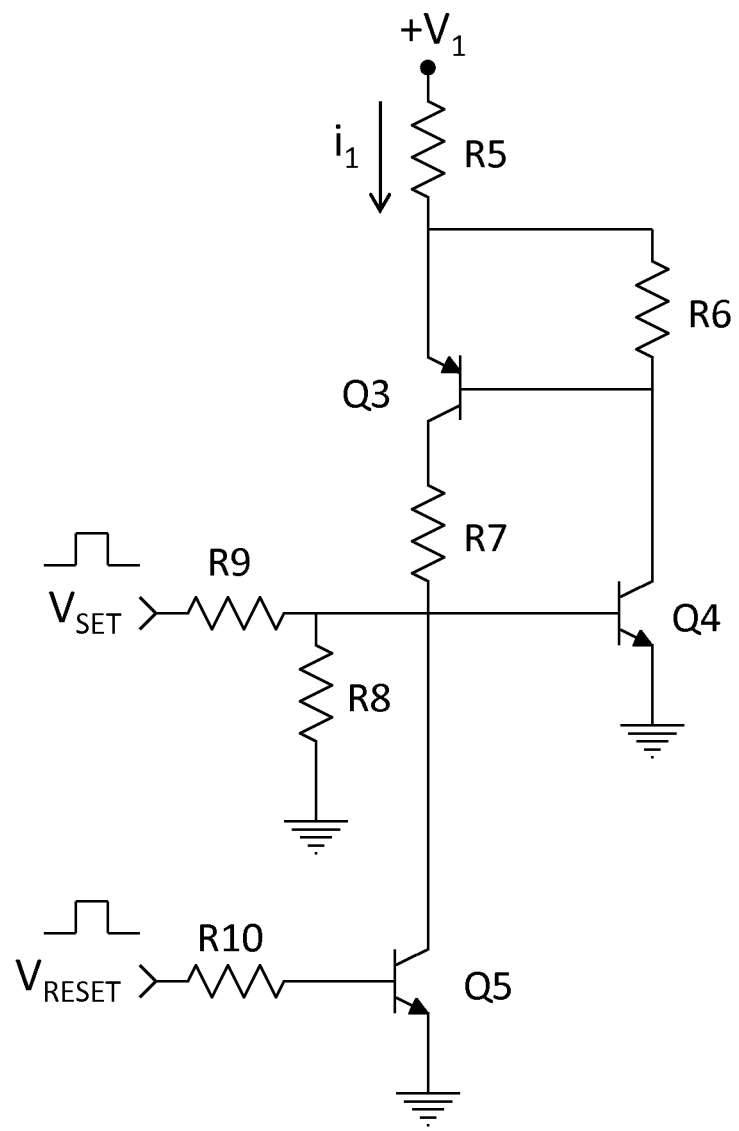
FIG. 2 is a schematic diagram for a self-biased latch circuit.

FIG. 2 is a schematic diagram for a self-biased latch circuit. The self-biased latch has no external power supply and it has SET and RESET inputs that turn it on and off. The latch is based on an npn and pnp transistor arranged such that the base current of each transistor is controlled by the collector current of the other. The operation of the circuit is as follows.

R8 is a large (e.g. 100 kΩ) resistor that grounds the base of Q4 to ensure that the latch circuit starts in an "off" condition at power up. When the latch is off, Q4 is cut off and cutoff resistor R6 keeps Q3 cut off. The overall resistance, $R_{SBL}$, between the $V_1$ terminal and ground is high and $i_1$ is zero.

When a positive voltage pulse is applied at $V_{SET}$: Q4 turns on which pulls the base of Q3 low and turns Q3 on; current $i_1$ flows; and current through limit resistor R7 keeps Q4 on. The overall resistance, $R_{SBL}$, between the $V_1$ terminal and ground is low. The latch is on.

When a positive voltage pulse is applied at $V_{RESET}$: Q5 turns on which pulls the base of Q4 low and turns Q4 off; turning Q4 off lets the base of Q3 rise which turns Q3 off. The overall resistance, $R_{SBL}$, between the $V_1$ terminal and ground is high. The latch is off.

R9 and R10 limit the base current in Q4 and Q5, respectively, when SET and RESET pulses are applied. R5 converts current $i_1$ to voltage $V_1$. Once the latch is on, it remains on until a RESET pulse is applied. Similarly, once the latch is off, it remains off until a SET pulse is applied.

Figure 3:
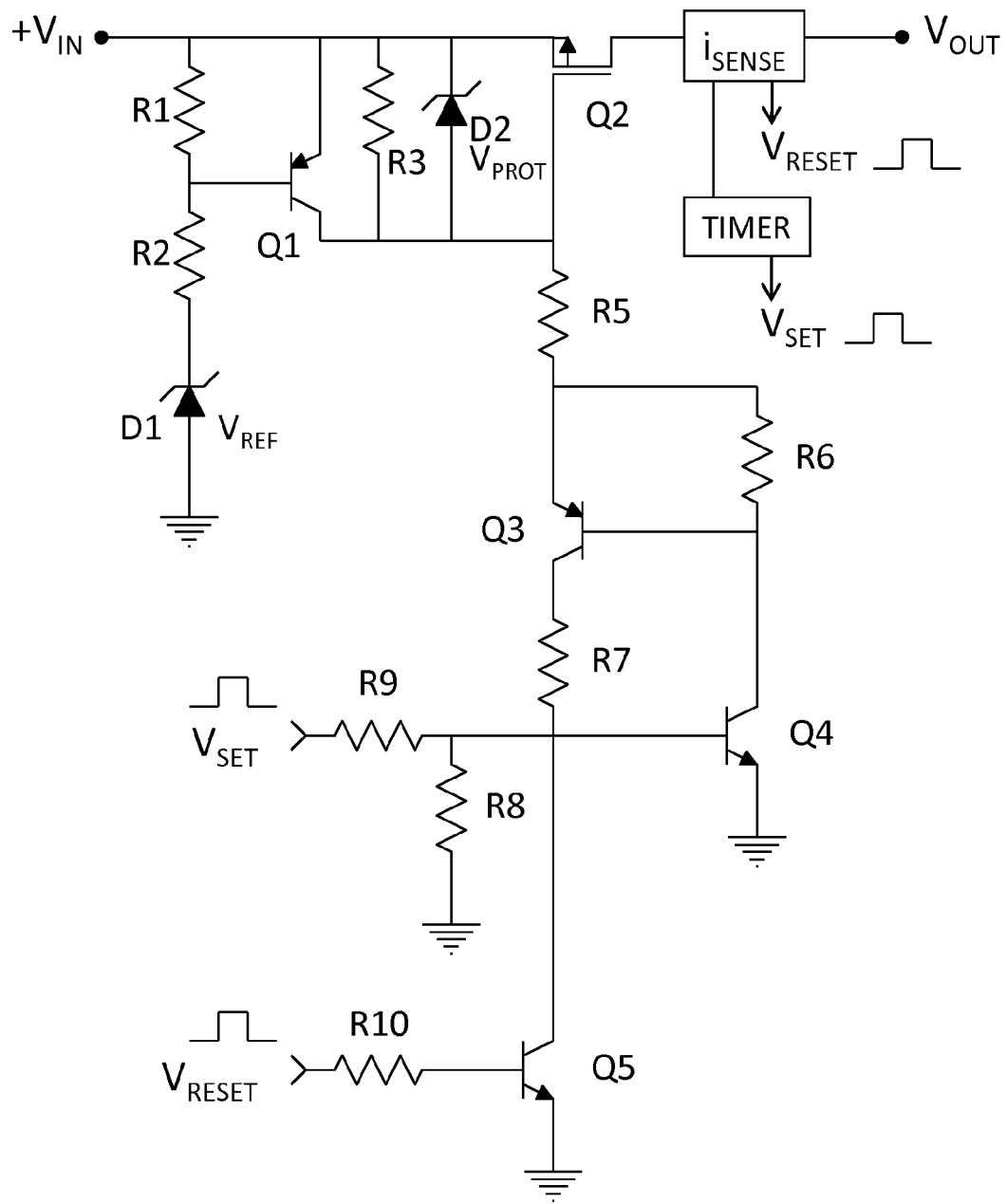
FIG. 3 is a schematic diagram for an overvoltage/overcurrent protection circuit with a self-biased latch.

FIG. 3 is a schematic diagram for an overvoltage/overcurrent protection circuit with a self-biased latch. Comparing FIGS. 1-3, it is apparent that the circuit of FIG. 3 is an overvoltage protection circuit similar to that of FIG. 1 with bias resistor R4 replaced by the self-biased latch of FIG. 2. In addition, current sensing and timer circuits are included, and R3 supplies power to the latch. The operation of the circuit is as follows.

With $V_{IN}$ in an acceptable range and before any pulse is applied at $V_{SET}$, the self-biased latch is off. $R_{SBL}$ (the overall resistance between the gate of MOSFET Q2 and ground) and R3 keep Q2 gate high and Q2 off. $V_{OUT}$ is zero. Here, "an acceptable range" might be, for example, <15V for a 12V electrical system or <30V for a 24V system.

When a positive pulse is applied at $V_{SET}$, the latch turns on, the gate of Q2 is pulled low, and Q2 turns on. $V_{OUT}$ is equal to $V_{IN}$ (ignoring the small source-drain voltage drop of Q2).

When an overvoltage condition exists at $V_{IN}$, i.e. $V_{IN}$>$V_{TR}$ (where $V_{TR}$=($V_{REF}$+$V_{BE}$)): current flows through D1; the base current of Q1 is ($V_{IN}$-$V_{TR}$)/R2; Q1 is saturated; the gate voltage of Q2 is ($V_{IN}$-$V_{CE}$); and Q2 is off. $V_{OUT}$ is equal to zero.

D1 is called the "reference diode" because it sets the input voltage above which the circuit cuts off the output. Q1 is called the "control transistor" because it supplies current to the self-biased latch to raise the gate voltage of Q2, turning Q2 off. Q2 is called the "pass transistor" because it controls the flow of current to $V_{OUT}$.

Figure 1:
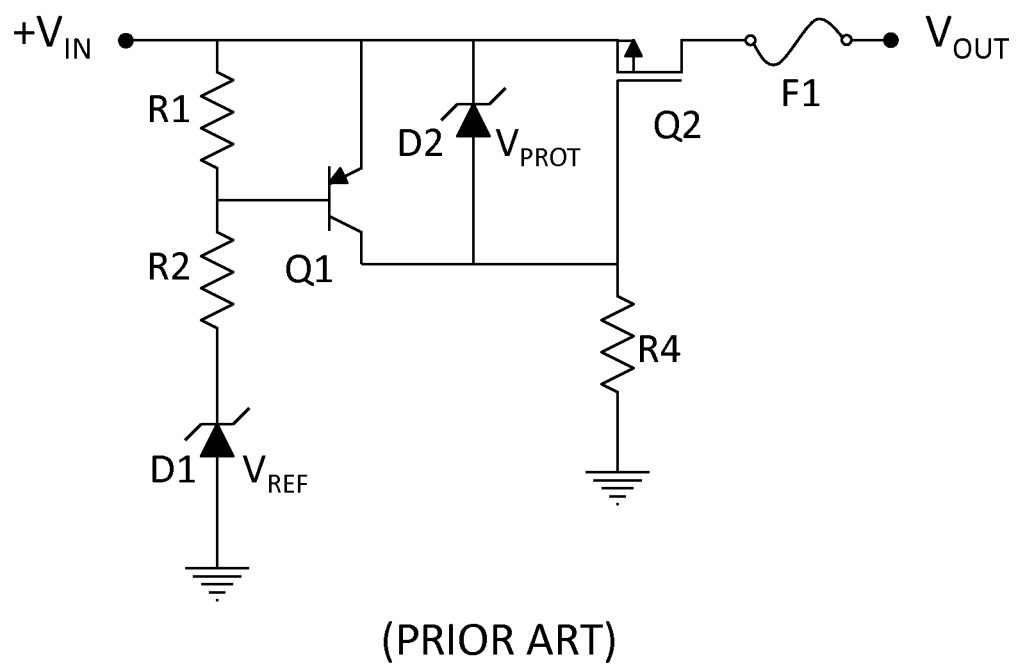
FIG. 1 is a schematic diagram for a conventional overvoltage protection circuit.

The circuit behaves like the circuit of FIG. 1 except that R4 has been replaced by $R_{SBL}$, i.e. the overall resistance between Q2 gate and ground, as determined by the state of the self-biased latch. When the overvoltage condition at $V_{IN}$ returns to normal (i.e. $V_{IN}$<$V_{TR}$), Q1 turns off, the latch brings Q2 gate low, and Q2 turns on.

(As before, $V_{BE}$ is the base-emitter voltage and $V_{CE}$ is the collector-emitter voltage of Q1. $V_{REF}$ is the breakdown voltage of Zener diode D1. Zener diode D2 protects Q2 by preventing the gate voltage from becoming too great. R1 keeps Q1 turned off when $V_{IN}$ is less than $V_{TR}$. R2 sets the base current of Q1 when D1 turns on.)

"$i_{SENSE}$" is a current sensor that supplies a reset signal to $V_{RESET}$ whenever an overcurrent condition is detected. An example of a current sensor is a differential amplifier that measures voltage across a shunt resistor. The output of the amplifier may be connected to a pulse generating circuit to produce a positive pulse output when the current through the shunt resistor exceeds a threshold value.

When $i_{SENSE}$ detects an overcurrent and sends a reset signal to $V_{RESET}$: the latch turns off, $R_{SBL}$ and R3 pull Q2 gate high, and Q2 turns off. $V_{OUT}$ is zero. After the overcurrent condition is removed, the latch may be set again by applying a pulse to $V_{SET}$.

"TIMER" in FIG. 3 is an optional timer that sends a pulse to $V_{SET}$ a short time after the $i_{SENSE}$ current sensor sends a signal to $V_{RESET}$ to indicate an overcurrent event. The timer sets the latch and tries to restore $V_{OUT}$. Of course if the overcurrent persists, $i_{SENSE}$ immediately turns the latch off and $V_{OUT}$ returns to zero. The timer may be configured to set the latch only once, a certain time after $i_{SENSE}$ sends a reset signal, or it may be configured to keep sending set pulses periodically.

Figure 4:
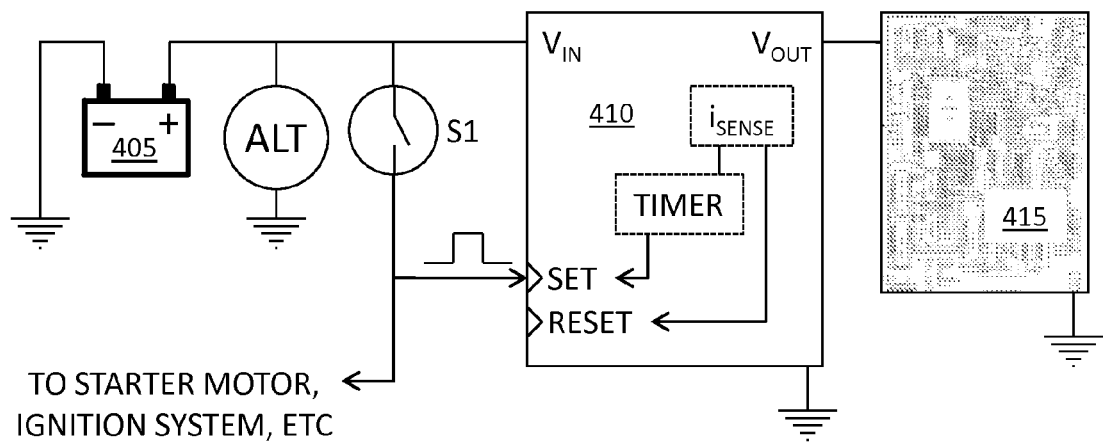
FIG. 4 is a simplified block diagram of an automotive electrical system with overvoltage/overcurrent protection for an electronic circuit.

FIG. 4 is a simplified block diagram of an automotive electrical system with overvoltage/overcurrent protection for an electronic circuit. FIG. 4 provides an example of the protection circuit of FIG. 3 in an automotive scenario. In FIG. 4, an alternator ("ALT") charges battery 405. Switch S1 is the starter/ignition switch that turns on the vehicle. Protection circuit 410 is the circuit of FIG. 3. Electronic circuit 415 is an electronic device (e.g. a microprocessor) that needs DC power from the battery to operate, but must be protected from voltage spikes and short circuits.

When an operator starts the vehicle by closing S1, a pulse generator circuit (not shown; e.g. a capacitor connected to the base of a transistor) sends a pulse to the SET input (i.e. $V_{SET}$ in FIG. 3) of protection circuit 410. $V_{OUT}$ is turned on, providing a protected power source for electronic device 415. Overvoltage and overcurrent protection is provided as described in connection with FIG. 3.

If protection circuit 410 includes an optional timer ("TIMER" in FIGS. 3 and 4) then it will set itself and supply power a short time after any overcurrent condition occurs. Alternatively, if the timer is not included, then the operator of the vehicle can recover from an overcurrent fault (e.g. a temporary short circuit) by turning the vehicle off (opening S1) and on again (closing S1).

Thus the overvoltage/overcurrent protection circuit with a self-biased latch provides an electronically resettable fuse with automatic overvoltage protection. The circuit of FIG. 3 may be adapted for negative supply voltages by replacing the p-channel MOSFET with an n-channel MOSFET, changing npn to pnp transistors and vice versa, and inverting the polarity of the Zener diodes. Pass transistor Q2 is preferably a MOSFET; however the circuit may also be implemented with Q2 being a BJT, power FET, IGBT or other transistor. The self-biased latch could be replaced with a conventional latch; however, conventional latches need an independent source of power which may not be conveniently available in automotive scenarios.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. An overvoltage protection circuit comprising:
    an input terminal having voltage $V_{IN}$;
    a Zener diode and a control transistor that define a trigger voltage $V_{TR}$;
    a pass transistor that controls an output terminal voltage $V_{OUT}$;
    a self-biased latch having an on state and an off state; wherein,
        the control transistor turns the pass transistor on if $|V_{IN}|<|V_{TR}|$ and the latch is on; and,
        the control transistor turns the pass transistor off if $|V_{IN}|>|V_{TR}|$ or the latch is off; and;
    a current sensor that turns the latch off if an overcurrent condition exists.

2. The circuit of claim 1 further comprising:
    a timer that turns the latch on after the current sensor turns the latch off.

3. The circuit of claim 1 further comprising:
    a timer that turns the latch on periodically.

4. The circuit of claim 1, the self-biased latch comprising: an npn transistor and a pnp transistor arranged in the circuit such that the base current of each transistor is controlled by the collector current of the other; a cutoff resistor that keeps the pnp transistor turned off when the latch is off; and, a limit resistor that limits the base current of the npn transistor when the latch is on.

5. The circuit of claim 1, the self-biased latch further comprising: a SET input and a RESET input, the SET input turning the latch on in response to a voltage pulse, and the RESET input turning the latch off in response to a voltage pulse.

6. The circuit of claim 1, the self-biased latch not having any source of electrical power other than that available from the input terminal.

7. The circuit of claim 1, $V_{IN}$ being greater than zero and the pass transistor being a p-channel MOSFET.

8. The circuit of claim 1, $V_{IN}$ being less than zero and the pass transistor being an n-channel MOSFET.

9. An overvoltage protection circuit comprising:
 an input terminal at voltage $V_{IN}$;
 a Zener diode and a control transistor that define a trigger voltage $V_{TR}$;
 a pass transistor that controls an output terminal at voltage $V_{OUT}$;
 a latch having an on state and an off state; wherein,
  the control transistor turns the pass transistor on if $|V_{IN}|<|V_{TR}|$ and the latch is on; and,
  the control transistor turns the pass transistor off if $|V_{IN}|>|V_{TR}|$ or the latch is off; and;
 a current sensor that turns the latch off if an overcurrent condition exists.

\* \* \* \* \*